US010290320B2

(12) United States Patent
Hu et al.

(10) Patent No.: US 10,290,320 B2
(45) Date of Patent: May 14, 2019

(54) AUTOMATIC MEDIA SUMMARY CREATION SYSTEMS AND METHODS

(71) Applicant: Verizon Patent and Licensing Inc., Arlington, VA (US)

(72) Inventors: Si Ying D. Hu, Sunnyvale, CA (US); Suri B. Medapati, San Jose, CA (US); Russell S. Horton, Fairfax, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 86 days.

(21) Appl. No.: 14/963,967

(22) Filed: Dec. 9, 2015

(65) Prior Publication Data

US 2017/0169853 A1 Jun. 15, 2017

(51) Int. Cl.

| | | |
|---|---|---|
| G11B 27/031 | (2006.01) |
| G06F 17/30 | (2006.01) |
| H04N 21/233 | (2011.01) |
| H04N 21/234 | (2011.01) |
| H04N 21/235 | (2011.01) |
| H04N 21/81 | (2011.01) |
| H04N 21/84 | (2011.01) |
| G11B 27/28 | (2006.01) |
| H04N 21/8549 | (2011.01) |
| G10L 15/08 | (2006.01) |
| G10L 15/26 | (2006.01) |

(52) U.S. Cl.
CPC ...... *G11B 27/031* (2013.01); *G06F 17/30843* (2013.01); *G11B 27/28* (2013.01); *H04N 21/233* (2013.01); *H04N 21/235* (2013.01); *H04N 21/23418* (2013.01); *H04N 21/8126* (2013.01); *H04N 21/84* (2013.01); *G10L 15/26* (2013.01); *G10L 2015/088* (2013.01); *H04N 21/8549* (2013.01)

(58) Field of Classification Search
CPC ........................... H04N 7/0882; G11B 27/034
See application file for complete search history.

(56) References Cited

U.S. PATENT DOCUMENTS

| | | | |
|---|---|---|---|
| 6,665,870 B1 * | 12/2003 | Finseth | H04N 5/44543 348/E5.105 |
| 2002/0083473 A1 * | 6/2002 | Agnihotri | G11B 27/105 725/140 |
| 2009/0192988 A1 * | 7/2009 | Ravikumar | G06F 17/30864 |
| 2009/0271283 A1 * | 10/2009 | Fosnacht | G06Q 20/123 705/26.1 |
| 2012/0027371 A1 * | 2/2012 | Hackett | G06F 17/30784 386/223 |
| 2012/0099793 A1 * | 4/2012 | Kumar | G06K 9/00751 382/190 |

(Continued)

*Primary Examiner* — Samira Monshi

(57) ABSTRACT

An exemplary method includes an automatic media summary creation system analyzing presentation data of a media program that includes at least one of an audio component and a video component, generating, based on the analyzing of the presentation data of the media program, a set of text data, selecting, based on an attribute of the media program, a predefined media summary template from a group of predefined media summary templates, and automatically generating a summary of the media program by using the generated set of text data to populate the selected predefined media summary template. Corresponding methods and systems are also described.

18 Claims, 11 Drawing Sheets

(56) References Cited

U.S. PATENT DOCUMENTS

2015/0172353 A1* 6/2015 Hannuksela ..... H04N 21/47217
709/219
2016/0055381 A1* 2/2016 Adsumilli .......... G06K 9/00751
386/241
2016/0366330 A1* 12/2016 Boliek .................. G06F 3/0484

* cited by examiner

AUTOMATIC MEDIA SUMMARY CREATION SYSTEMS AND METHODS

BACKGROUND INFORMATION

There are diverse ways for people to find and consume media programs. For example, a user wanting to experience a media program may utilize a computing device to access a user interface associated with a media program service to browse available media programs. Such a media program service typically provides a user with tools for discovering and accessing a media program, such as user interface tools that provide information about the media program and facilitate access to the media program by the user. In certain examples, such information may include summaries of media programs. Such summaries of media programs are typically created manually by humans. The process of manually creating a summary is time consuming and/or expensive. As a result, summaries of media programs are typically created only for certain media programs such as mainstream movies and/or television programs.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary automatic media summary creation systems and methods are described herein. In certain examples, an automatic media summary creation system may analyze presentation data of a media program that includes at least one of an audio component and a video component. Based on the analysis of the presentation data of the media program, the automatic media summary creation system may generate a set of data associated with the media program. In certain examples, the set of data may include a set of text data and/or a set of image data associated with the media program. The automatic media summary creation system may select a predefined media summary template from a group of predefined media summary templates based on an attribute of the media program and automatically generate a summary of the media program by using the generated set of data to populate the selected predefined media summary template.

Various benefits may be realized in accordance with the systems and methods described herein. For example, exemplary systems and methods described herein may facilitate efficient and/or cost-effective automatic creation of summaries of media programs. Exemplary systems and methods described herein may be applied to diverse types of media programs to generate summaries for a wide variety of media programs of different types. In addition, certain systems and methods described herein may automatically create media summaries that include user-selectable options to facilitate convenient playback of media programs. These and/or additional or alternative benefits that may be provided by exemplary systems and methods described herein will be made apparent by the following description. Exemplary automatic media summary creation systems and methods will now be described in reference to the accompanying drawings.

Figure 1:
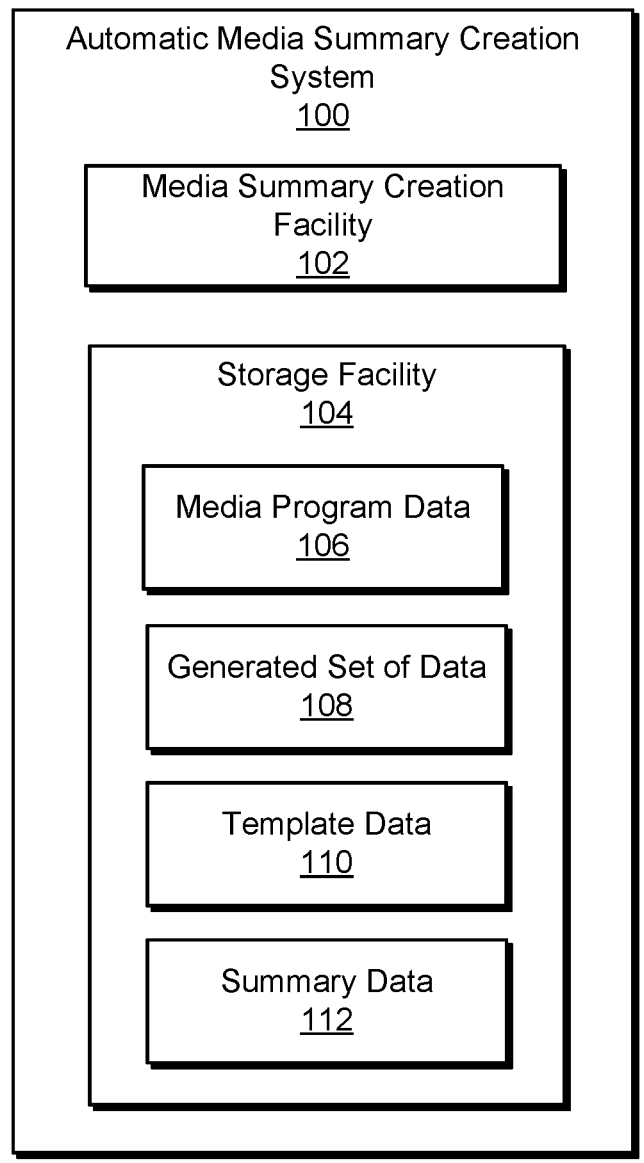
FIG. 1 illustrates an exemplary automatic media summary creation system according to principles described herein.

FIG. 1 illustrates an exemplary automatic media summary creation system 100 ("system 100"). System 100 may perform one or more of the operations described herein to automatically create media summaries of media programs. As shown in FIG. 1, system 100 may include, without limitation, a media summary creation facility 102 ("creation facility 102") and a storage facility 104 selectively and communicatively coupled to one another. Facilities 102 and 104 may be communicatively coupled one to another by any suitable communication technologies.

It will be recognized that although facilities 102 and 104 are shown to be separate facilities in FIG. 1, the facilities 102 and 104 may be combined into a single facility or split into additional facilities as may serve a particular implementation. Additionally or alternatively, one or more of the facilities 102 and 104 may be omitted from and external to system 100 in other implementations. For example, storage facility 104 may be external of system 100 in some alternative implementations. Facilities 102-104 of system 100 may include or be otherwise implemented by one or more physical computing devices. In such implementations, system 100 may be referred to as a computer-implemented system 100. Facilities 102 and 104 will now be described in more detail.

Storage facility 104 may store media data 106 representative of a media program and/or content that makes up the media program and/or is used or usable to present the media program to a user. Storage facility 104 may also store generated sets of data 108 (e.g., generated sets of text data and/or generated sets of image data) representative of data generated by creation facility 102 based on an analysis of media program data 106. Examples of sets of data that may be generated by creation facility 102 based on an analysis of media program data 106 are described herein.

In addition, storage facility 104 may store template data 110 representative of one or more predefined media summary templates and summary data 112 representative of one or more media summaries generated by creation facility 102 based on generated sets of data 108 and the one or more predefined media summary templates. Examples of creation facility 102 using a predefined media summary template to generate a summary of a media program are described herein. Storage facility 104 may maintain additional or alternative data as may serve a particular implementation.

Creation facility 102 may perform one or more operations to automatically create a summary of a media program. To that end, creation facility 102 may analyze presentation data of a media program that includes at least one of an audio component and a video component. As used herein, "presentation data" may refer to any data representative of content that makes up a media program and/or is used or usable to present the media program to a user. For example, presentation data may represent content that may be used by a media player device to play back the media program and/or content that may be derived from playback of the media program. Such presentation data may include, for example, audio data (e.g., data representative of sounds, spoken words, etc.), image scene data (e.g., data representative of images of text, objects, persons, places, etc. visually depicted during presentation of the media program), derived text data (e.g., text data created by speech-to-text converting audio data of the media program), closed captioning data, and/or any other suitable data associated with presentation of the media program. In certain examples, the presentation data may only include certain specific types of data. For example, the presentation data may only include closed captioning data, audio data, and/or image scene data of a media program. In certain examples, presentation data may only include actual presentation content (e.g., actual audio content and/or actual video content that may be presented during playback of the media program) and may not include any additional data (e.g., no closed captioning data, no title data, no metadata, etc.) associated with the media program.

As used herein, the term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, video clip, audio clip, user-generated audio program, user-generated video program, or any other media program or audio-video program that may be played back by a media player device for presentation to a user (e.g., a media program that a user may access and consume by way of a media program service).

Creation facility 102 may analyze the presentation data of the media program at any suitable time. For example, creation facility 102 may analyze the presentation data during or after an initial broadcast (e.g., a live telecast) of the media program by a media program service provider. In certain examples, creation facility 102 may analyze the presentation data while the media program is played back by a media player device. Additionally or alternatively, creation facility 102 may analyze the presentation data at any suitable time by analyzing a set of one or more data files in which data representative of the media program is stored. Creation facility 102 may analyze the presentation data of the media program at other times in other implementations.

Creation facility 102 may analyze the presentation data of the media program in any suitable manner. For example, creation facility 102 may apply one or more natural language processing and/or automatic summarization techniques to analyze the presentation data and find the most informative words, phrases, sentences, etc. that are representative of the media program. Such automatic summarization techniques may include extractive methods and/or abstractive methods. With extractive methods, creation facility 102 may analyze the presentation data and select, for example, a subset of existing words, phrases, and/or sentences in the media program (e.g., in closed captioning data and/or in speech-to-text converted audio data) to extract from the media program. With abstractive methods, creation facility 102 may analyze the presentation data and build an internal semantic representation of the media program. Creation facility 102 may use such an internal semantic representation to paraphrase and/or condense, for example, sentences, phrases, etc. included in or that may be derived from the presentation data of the media program.

In certain examples, creation facility 102 may analyze the presentation data to derive one or more words, phrases, sentences, etc. that are not explicitly present in the media program. In such examples, creation facility 102 may analyze image scene data of the media program in any suitable manner to derive the one or more words, phrases, sentences, etc. For example, creation facility 102 may utilize one or more neural network architectures (e.g., multimodal recurrent neural network architectures that include bidirectional recurrent neural networks and/or convolutional neural networks) to analyze the image scene data. Such neural network architectures may be able to learn how to determine similarities and/or patterns in image scene data. To illustrate, creation facility 102 may utilize one or more neural network architectures to analyze a first region of an image and a second region of the image. Based on the similarities and/or patterns between, for example, objects, persons, etc. in the first region and the second region, creation facility 102 may derive one or more words, phrases, sentences, etc. that are descriptive of the image. In certain examples, creation facility 102 may derive natural language text descriptions for an image included in the image scene data based on the determined similarities.

In certain examples, creation facility 102 may analyze image scene data of a media program by analyzing images included in every $N^{th}$ frame of the media program. To illustrate, creation facility 102 may analyze images (e.g., objects, persons, locations, text, etc.) included in every $10^{th}$ frame of a media program (e.g., every $10^{th}$ I-frame). Creation facility 102 may analyze the images included in every $10^{th}$ frame in any suitable manner. For example, creation facility 102 may utilize one or more neural network architectures to identify the images and/or derive words and/or text descriptions from every $10^{th}$ frame of the media program.

In certain examples, creation facility 102 may analyze presentation data that only includes actual presentation content. In such examples, creation facility 102 may analyze only the actual presentation content, in any suitable manner, to identify images and/or derive words and/or text descriptions from the media program. This may allow creation facility 102 to automatically generate summaries of media programs in which certain types of data (e.g., metadata, closed captioning data, etc.) may not exist or may not be accessible.

The foregoing description regarding how creation facility 102 may analyze presentation data is provided for illustrative purposes only. Creation facility 102 may analyze the presentation data of a media program in other suitable ways in other implementations.

Based on the analysis of the presentation data, creation facility 102 may generate a set of data associated with the media program. The set of data may include any suitable data associated with the media program that may be derived based on analysis of the presentation data of the media program. Each instance of data included in the set of data may include information identifying the data, identifying a timing indicator (e.g., a playback time point of the media program associated with the data), identifying a category of the data, and/or identifying any other suitable information associated with the data.

In certain examples, the set of data may include a set of text data associated with the media program. The set of text data may include words and/or sentences extracted from the presentation data that are descriptive of content, objects, themes, topics, participants, etc. that make up the media program. As mentioned, each instance of text data included in the set of text data may include any suitable information associated with that particular instance of text data. To illustrate, the set of text data may include an instance of text data that identifies a topic presented during the media program. The instance of text data associated with the topic may also include a timing indicator that identifies when the topic is presented in the media program, information regarding a category of the topic, and/or any other suitable information.

Additionally or alternatively, the set of data may include a set of image data. The set of image data may include any suitable image data that may be extracted from presentation data of a media program. For example, the set of image data may include still images, video clips, audio clips, etc. of the media program. Similar to the set of text data, each instance of image data included in the set of image data may include any suitable information associated with that particular instance of image data. To illustrate, the set of image data may include an instance of image data that has been analyzed by creation facility 102 to derive objects, locations, and/or people that appear in a particular image of the media program. Additionally or alternatively, the set of image data may include an instance of image data that includes a video clip of a particular scene of the media program. The instance of image data may identify the particular scene presented during the media program. The instance of image data associated with the particular scene may also include a timing indicator that identifies when the particular scene is presented in the media program, information regarding a category of the particular scene, and/or any other suitable information.

Timing indicators included in image data and/or text data may be utilized in any suitable manner. For example, the timing indicators may facilitate searching for specific portions of the media program and/or may facilitate a user navigating the media program by way of a generated summary of the media program, such as described herein.

In certain examples, the set of image data may be temporally aligned with the set of text data. For example, the set of text data may include a first sentence of dialogue presented at a first time point during presentation of the media program and a second sentence of dialogue presented at a second time point during presentation of the media program. The set of image data may include a first image presented during the first time point and a second image presented during the second time point. Accordingly, based on their being respectively presented during the first and second time points, the first sentence and the first image and the second sentence and the second image may be considered as being temporally aligned.

Creation facility 102 may generate the set of data in any suitable manner. In certain examples, creation facility 102 may generate a set of text data by identifying at least one of a sentence and a word to extract from the presentation data and include in the set of text data. For example, creation facility 102 may identify, from closed captioning data of the media program, a plurality of words and/or sentences to be included in the set of text data. When creation facility 102 extracts words and/or sentences from closed captioning data, there may be some lag time between when, for example, dialogue is presented in the media program and the closed captions are presented. In such examples, creation facility 102 may account for (e.g., correct) the lag time such that the text data included in the set of text data that is derived from the closed captions is temporally aligned with the dialogue in the media program. This may be accomplished in any suitable manner. For example, the dialogue presented in the media program may be automatically transcribed into text through an automatic speech recognition ("ASR") system that generates data indicating the exact timing of the transcribed text. Creation facility 102 may compare the timing of the text transcribed through the ASR system with the timing of the closed captions to identify and correct for the lag time between when the dialogue is presented in the media program and when the closed captions are presented.

Creation facility 102 may identify at least one of a sentence and a word to extract from the presentation data for inclusion in the set of text data in any suitable manner. For example, based on an analysis of presentation data, creation facility 102 may select worthy (e.g., the most informative) words and/or sentences from the presentation data based on a trained classifier such as a Naive Bayes classifier and/or based on a decision tree useful to calculate information entropy. In certain examples, based on an analysis of presentation data, creation facility 102 may analyze grammatical and/or sequential patterns of, for example, speech included in the media program to find the most important and/or referred to words in the media program. Creation facility 102 may analyze the grammatical and/or sequential patterns in any suitable manner such as by using, for example, hidden Markov chains and/or one or more neural network architectures.

Additionally or alternatively, creation facility 102 may generate the set of text data by performing a named-entity recognition process to identify one or more named entities associated with the media program. As used herein, a "named entity" may refer to any named subject, object, place, person, etc. that may be identified based on the presentation data. The named-entity recognition process may include creation facility 102 locating and classifying elements in text (e.g., in closed captioning data and/or derived text data) into pre-defined categories such as names of persons, names of places, names of organizations, names of locations, times, quantities, etc. Creation facility 102 may then generate the set of text data based on the classified elements. In certain examples, creation facility 102 may apply any suitable named-entity recognition process or system to identify one or more named entities associated with the media program.

Additionally or alternatively, creation facility 102 may generate the set of text data and/or the set of image data by identifying a theme associated with the media program. The theme may include any suitable theme that may be associated with the media program. For example, a theme of a media program may correspond to a news theme, an action movie theme, a romance movie theme, a comedy movie theme, a horror movie theme, an instructional theme, a sitcom theme, a sports theme, or any other suitable theme. To illustrate, creation facility 102 may analyze the presentation data and determine that the media program is associated with an action movie theme. Creation facility 102 may then generate the set of text data and/or the set of image data based on the action movie theme, for example, by identifying either text associated with action sequences (e.g., shootouts, car chase scenes, etc.) to include in the set of text data or images, audio clips, and/or video clips of the action sequences to include in the set of image data. In certain examples, creation facility 102 may apply any suitable topic model process or system (e.g., a topic model that identifies and uses word usage statistics) to identify one or more topics associated with the media program.

In certain examples, creation facility 102 may generate a set of text data and/or a set of image data based on analyzed image scene data of the media program. To illustrate, in the example described above, creation facility 102 may generate the set of text data by creating a set of visually-derived words based on analyzed images in every $10^{th}$ frame of the media program. Additionally or alternatively, creation facility 102 may generate the set of image data based on the analyzed images in every $10^{th}$ frame. Creation facility 102 may determine what visually-derived words to include in the set of text data and/or what images to include in the set of image data by utilizing any suitable neural network architecture, such as described herein.

In certain examples, creation facility 102 may, in addition or alternative to utilizing presentation data, utilize data associated with user interaction with a media program to generate a set of text data and/or a set of image data associated with a media program. For example, creation facility 102 may monitor or otherwise access user interaction data that is indicative of a manner in which a plurality of users interact with a particular media program (e.g., by pausing, rewinding, re-watching, etc.) during playback of the particular media program. Creation facility 102 may utilize such user interaction data in any suitable manner to determine what content to include in the set of text data and/or the set of image data. To illustrate, if a relatively large number of users included in the plurality of users interact with a certain section of the media program in a similar manner (e.g., by pausing the media program during the same scene), such an interaction may be a good indication that the certain section is popular among the plurality of users. Accordingly, creation facility 102 may include data representative of the certain section of the media program in the set of text data and/or the set of image data. Conversely, if there is little or no user interaction with an additional section of the media program, the additional section of the media program may be unimportant to the plurality of users. Accordingly, creation facility 102 may not include data representative of the additional section of the media program in the set of text data and/or the set of image data.

In certain examples, creation facility 102 may, in addition or alternative to utilizing presentation data, utilize information regarding how a user shares a media program to generate a set of text data and/or a set of image data associated with a media program. For example, creation facility 102 may acquire, from any suitable source, information about how one or more users share a media program through social media by, for example, creating video clips, audio clips, and/or still images of the media program and sharing them via a social media platform such as YOUTUBE, TWITTER, INSTAGRAM, etc. Creation facility 102 may search such resources to find the most shared portions of a media program, and use that information to generate the set of text data and/or the set of image data associated with the media program.

In certain examples, creation facility 102 may, in addition or alternative to utilizing presentation data, utilize externally available data to generate a set of text data and/or a set of image data associated with a media program. Such externally available data may include externally available metadata and/or externally available descriptive data. In certain examples, such externally available data may include unstructured data such as WIKIPEDIA articles and/or newspaper reviews about a media program. Additionally or alternatively, such externally available data may include structured data that may be accessed, for example, by way of a media content provider's application programing interface. Such structured data may include aggregated ratings from different sources, enhanced metadata about the media program (e.g., information regarding the, cast, crew, etc.), and/or any other suitable structured externally available data. Creation facility 102 may search such externally available data to find relevant portions of a media program, and use that information to generate the set of text data and/or the set of image data associated with the media program.

Creation facility 102 may select a predefined media summary template from a group of predefined media summary templates based on an attribute of a media program. As used herein, an "attribute" of the media program may refer to any attribute of the media program that may be used to select a predefined media summary template. For example, the attribute may be a genre of the media program, a category of the media program, a theme of the media program, a source of the media program, and/or any other suitable attribute. The attribute of the media program may be derived using any suitable data that may be obtained from any suitable source. For example, the attribute of the media program may be derived based on structured externally available data associated with a media program, unstructured externally available data associated with a media program, the generated set of data (e.g., the set of text data and/or the set of image data generated by creation facility 102), metadata included with the media program, and/or any other suitable data.

In certain examples, creation facility 102 may derive the attribute of the media program from at least one of metadata associated with the media program and the generated set of data (e.g., the set of text data and/or the set of image data generated by creation facility 102) associated with the media program. For example, based on metadata associated with the media program, creation facility 102 may determine that the media program corresponds to a specific type of sporting event. Based on this attribute, creation facility 102 may select a predefined media summary template that is specific to the type of sporting event and may be used by creation facility 102 to automatically generate a summary of the sporting event.

In certain examples, each media summary template included in the group of predefined media summary templates may be specific to a particular category of media program. For example, the group of predefined media summary templates may include sport summary templates (e.g., a football game summary template, a baseball game summary template, a soccer match summary template, etc.), movie summary templates, end-user-generated media program summary templates (e.g., YOUTUBE content summary templates, YOUTUBE channel summary templates, etc.), gaming channel summary templates, television series summary templates, news summary templates, video clip summary templates, audio clip summary templates, audio program summary templates, and/or any other suitable predefined media summary template.

In certain examples, a predefined media summary template may be a predefined text media summary template that may be used to generate a text media summary. Alternatively, a predefined media summary template may be a predefined video media summary template that may be used to generate a video summary of a media program. In certain examples, a predefined media summary template may be a combined text and video media summary template that may be used to generate a combined text and video summary of the media program.

A predefined text media summary template may have any suitable form as may suit a particular implementation. For example, a predefined text media summary template may be narrative in form and may include one or more narrative sentences having portions (e.g., fields) that may be automatically filled in by creation facility 102 based on a set of data associated with a media program. Additionally or alternatively, a predefined text summary template may include a listing of information in one or more columns that may be automatically filled by creation facility 102 based on the set of data associated with the media program. Examples of predefined text media summary templates are provided herein.

A predefined video media summary template may have any suitable form as may suit a particular implementation. For example, a predefined video media summary template may include instructions and/or parameters that creation facility 102 may use to automatically generate a set of highlights, a trailer, a recap, a preview of the media program, and/or any other suitable video summary. To illustrate, an exemplary predefined video media summary template for automatically generating a preview (e.g., a trailer) of a comedy movie may include instructions to extract an audio-video clip of a title scene of the comedy movie and audio-video clips of a first, a second, and a third comedic scene of the comedy movie.

In certain examples, creation facility 102 may generate predefined media summary templates to be used for any suitable purpose, such as described herein. Creation facility 102 may generate a predefined media summary template in any suitable manner. For example, creation facility 102 may generate a predefined media summary template based on similarities between media programs of a particular type, category, genre, etc. To illustrate, creation facility 102 may determine that each episode of a particular type of news program follows a particular pattern in which there is an introduction section during which a news anchor talks about a first topic, an intermediate section during which the news anchor interviews a guest and discusses a second topic, and a closing section during which the news anchor talks about a third topic. Based on this pattern, creation facility 102 may create a predefined news program summary template to be used to automatically generate summaries for each episode of the news program.

Additionally or alternatively, creation facility 102 may access pre-generated predefined media summary templates from a third party (e.g., a media program provider) and/or any other suitable source. Specific examples of predefined media summary templates are provided herein.

After creation facility 102 selects a predefined media summary template, creation facility 102 may automatically generate a summary of the media program. Creation facility 102 may automatically generate the summary of the media program in any suitable manner. For example, creation facility 102 may use the generated set of data to populate the selected predefined media summary template. Examples of how creation facility 102 may populate a selected predefined media summary template are provided herein.

In certain examples, creation facility 102 may automatically generate the summary of the media program by automatically generating a text summary of the media program. In such examples, the selected predefined media summary template may be a predefined text summary template, which creation facility 102 may populate using words and/or sentences included in a generated set of text data. Examples of automatically-generated text summaries of media programs are provided herein.

Additionally or alternatively, creation facility 102 may automatically generate the summary of the media program by automatically generating a video summary. In such examples, the selected predefined media summary template may be a predefined video summary template. Creation facility 102 may generate the video summary based on the generated set of text data and/or the generated set of image data. For example, creation facility 102 may use images, audio clips, and/or video clips included in a set of image data to automatically generate a video summary associated with the media program. In addition, creation facility 102 may use words and/or sentences from the set of text data, for example, to provide a caption, title, and/or any other suitable text together with the video summary.

In certain examples, creation facility 102 may automatically generate a plurality of media summaries for a given media program. For example, creation facility 102 may extract, from closed captioning data of a media program, text data in a first language, a second language, and a third language. Based on the extracted text data, creation facility 102 may automatically generate a first text summary for the media program in the first language, a second text summary for the media program in the second language, and a third text summary for the media program in the third language. Additionally or alternatively, creation facility 102 may automatically generate one or more video summaries for the given media program. Creation facility 102 may automatically generate any number of media summaries for a particular media program as may suit a particular implementation.

In certain examples, creation facility 102 may generate a text summary that includes one or more user-selectable options to facilitate playback of a media program. For example, a text summary may include a first link that maps to a first portion of the media program, a second link that maps to a second portion of the media program, and a third link that maps to a third portion of the media program. The user may select any one of the first link, the second link, and the third link included in the text summary and be presented with the portion of the media program mapped to the selected link. Examples of user-selectable options in an automatically-generated text summary are described herein.

In certain examples, creation facility 102 may automatically generate the summary of the media program based on a search request input, in any suitable manner, by a user of a computing device. The search request may include any suitable topic, term, keyword, question, etc. that creation facility 102 may use to generate the summary. Based on the information included in the search request, creation facility 102 may select image data and/or text data associated with a media program and a predefined media summary template to use to automatically generate the summary. To illustrate, a user may enter a search request that includes the name of an actor that stars in a particular movie and a location portrayed in the movie. Based on the search request, creation facility 102 may automatically generate, for example, a video summary of the movie that includes a clip of each scene of the movie starring the actor at the location.

Creation facility 102 may automatically generate the summary of the media program at any suitable time. For example, creation facility 102 may automatically generate the summary of the media program either during or after receiving the media program from a media program provider. In certain examples, creation facility 102 may automatically generate the summary in response to a network broadcast of the media program from a media program provider or in response to system 100 receiving data representative of the media program from the media program provider. Alternatively, creation facility 102 may automatically generate the summary of the media program in response to an end user of a computing device (e.g., an end user of a media program service) uploading the media program to, for example, the media program service and/or to a media program hosting web portal such as YOUTUBE.

Figure 2:
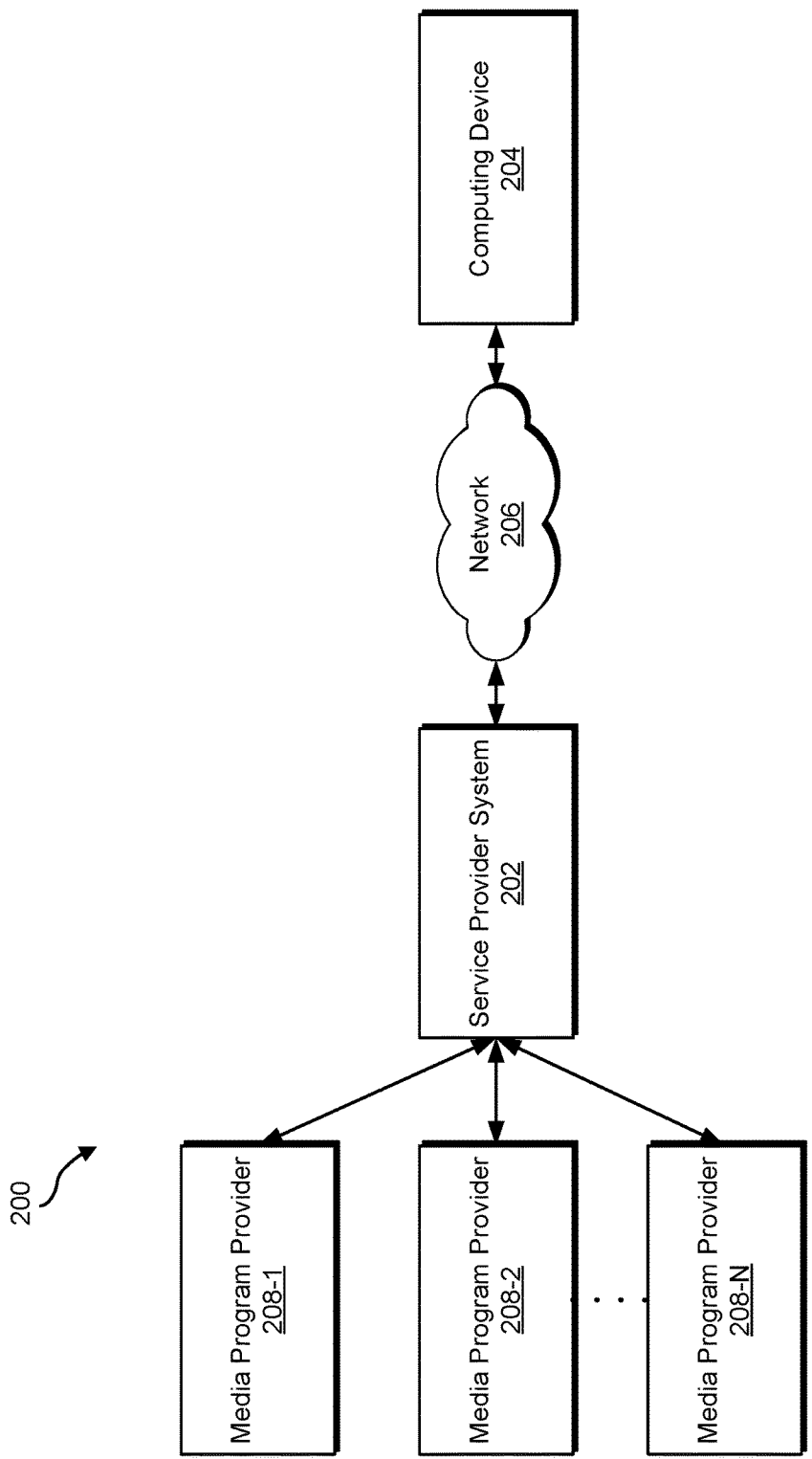
FIG. 2 illustrates an exemplary implementation of the system of FIG. 1 according to principles described herein.

Creation facility 102 may communicate with one or more media program providers and/or other devices or systems in any suitable manner. To illustrate, FIG. 2 shows an exemplary implementation 200 of system 100 in which a service provider system 202 is communicatively coupled to a computing device 204 by way of network 206. As shown in FIG. 2, service provider system 202 is also communicatively coupled to media program providers 208 (e.g., media program providers 208-1 through 208-N). Creation facility 102 and storage facility 104 may each be implemented by service provider system 202, computing device 204, and/or one or more of media program providers 208. Accordingly, in certain embodiments, components of system 100 may be implemented entirely by service provider system 202, by computing device 204, or by one or more of media program providers 208. In other embodiments, components of system 100 may be distributed across two or more of service provider system 202, computing device 204, and media program providers 208.

Service provider system 202 may be associated with a service provider (e.g., a subscriber television service provider, an Internet service provider, a mobile communications service provider, a video hosting service provider, an audio hosting service provider, etc.) and/or any other type of service provider. Accordingly, service provider system 202 may be configured to provide one or more services (e.g., mobile communications services, television services, video-on-demand services, Internet services, application services, video hosting services, audio hosting services, etc.) to end users of the service(s) by way of end-user computing devices (e.g., computing device 204). Service provider system 202 may be implemented by one or more computing devices (e.g., server computing devices) as may serve a particular implementation. Service provider system 202 may manage media programs, interface with one or more application programing interfaces associated with media program providers 208, and/or perform any other operations associated with the methods and systems described herein.

Service provider system 202, computing device 204, and media program providers 208 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Long Term Evolution ("LTE") technologies, Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Radio Frequency ("RF") signaling technologies, wireless communication technologies, Internet communication technologies, and other suitable communications technologies.

In certain embodiments, service provider system 202, computing device 204, and media program providers 208 may communicate via network 206. Network 206 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., transmitting media program data and/or summaries of media programs) and/or communications signals between service provider system 202, computing device 204, and media program providers 208. Communications between service provider system 202, computing device 204, and media program providers 208 may be transported using any one of the above-listed networks, or any combination or sub-combination of the above-listed networks. Alternatively, service provider system 202, computing device 204, and media program providers 208 may communicate in another way such as by direct connections between service provider system 202, computing device 204, and media program providers 208.

Computing device 204 may be associated with (e.g., owned and/or operated by) an end user of a media program service and may include any suitable computing device that may be configured to present a summary of a media program to the end user. For example, the computing device may include, but is not limited to, a mobile phone, a smart phone, a tablet computer, a laptop computer, a desktop computer, and/or any other computing device as may serve a particular implementation. Although FIG. 2 illustrates only one computing device 204, it is understood that a plurality of computing devices, which may be associated with a plurality of users, may communicate with service provider system 202 by way of network 206.

Media program providers 208 may include any suitable source of media programs. For example, media program providers 208 may include one or more studios that generate media programs for consumption by a user of computing device 204. Additionally or alternatively, media program providers 208 may include end users of computing devices that generate end-user-generated media programs and upload such media programs for distribution to users of additional computing devices by way of, for example, a video sharing web portal (e.g., YOUTUBE). Media program providers 208 may include or be implemented by one or more computing devices as may serve a particular implementation.

Returning to FIG. 1, creation facility 102 may use or otherwise provide a summary to be used (e.g., by a third party) for any suitable purpose. For example, the summary may be provided for display in a graphical user interface together with user interface tools configured to facilitate presentation of a particular media program to a user. Examples of such graphical user interfaces are described herein.

Additionally or alternatively, creation facility 102 may use or otherwise provide a summary to be used as metadata for a media program, as an input for a media content recommendation system, and/or as a program listing for the media program. For example, one or more summaries of media programs may be provided for display in a media program browse view (e.g., a media program guide user interface view, a media feed user interface view, etc.) that may include a plurality (e.g., a grid) of graphical objects that represent media programs available for access by way of a media service provider.

In certain examples, content included in a summary of a media program may be searchable by a user. For example, a user may, through any suitable computing device, perform a search operation to search a plurality of summaries for scenes, video clips, and/or audio clips by topics, keywords, etc. Automatically-generated summaries such as those described herein may be utilized in any other suitable manner in other implementations.

Figure 3:
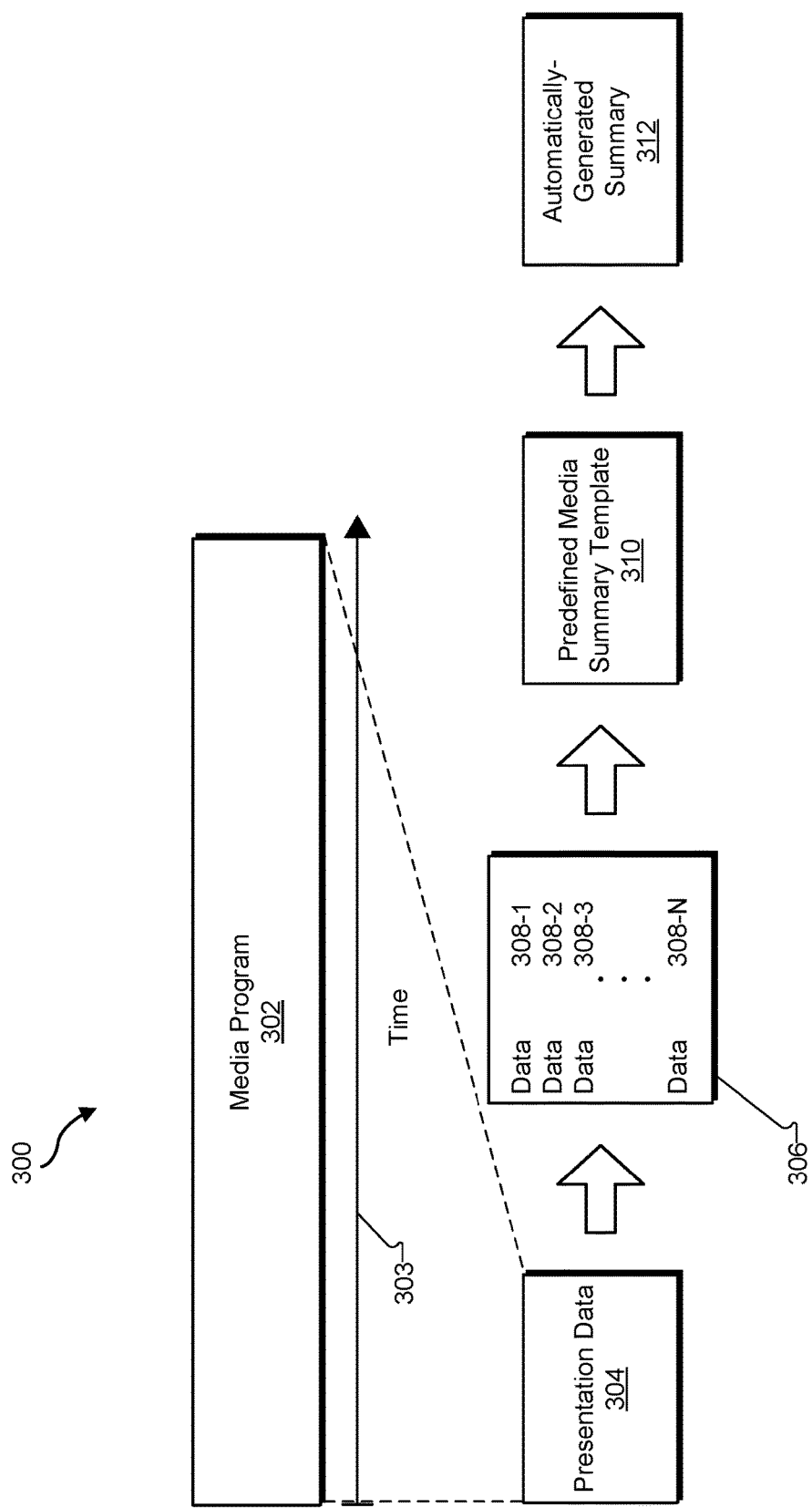
FIGS. 3-4 illustrate exemplary flow diagrams associated with automatic creation of a summary of a media program according to principles described herein.

FIG. 3 illustrates an exemplary flow diagram 300 that visually depicts a media program 302 arranged along a time axis 303. As shown in FIG. 3, presentation data 304 is associated with media program 302 (as represented by dashed lines interconnecting media program 302 and presentation data 304). For example, presentation data 304 may include closed captioning data, derived text data, image scene data, and/or audio data of media program 302, as described above. Creation facility 102 may analyze presentation data 304 in any suitable manner, such as described herein, and generate a set of data 306 that includes data instances 308 (e.g., data instances 308-1 through 308-N) associated with media program 302. Set of data 306 may include any suitable data instances that may be derived and/or extracted based on presentation data 304. For example, each data instance 308 included in set of data 306 may comprise a word or a sentence derived and/or extracted from presentation data 304 by creation facility 102. In addition, each data instance 308 included in set of data 306 may include a timing indicator identifying a time point of media program 302 that corresponds to the particular word or sentence. Each data instance 308 may also include any other suitable information, such as described herein. Creation facility 102 may select a predefined media summary template 310 from a group of predefined media summary templates based on set of data 306 (e.g., based on one or more data instances 308 in set of data 306) and/or metadata associated with media program 302. Creation facility 102 may then populate predefined media summary template 310 with one or more data instances 308 of set of data 306 to generate an automatically-generated summary 312 of media program 302.

Figure 4:
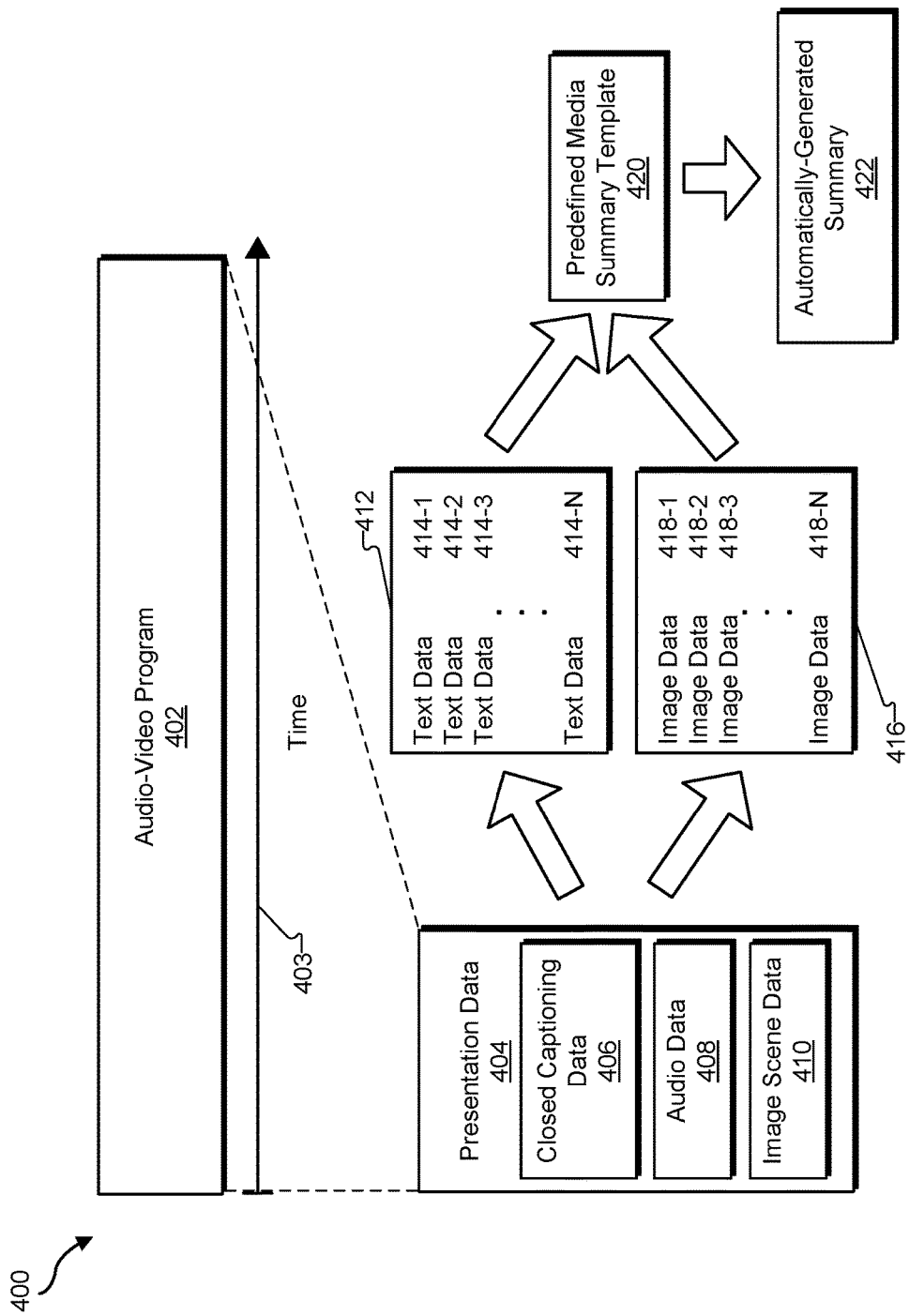

FIG. 4 illustrates another exemplary flow diagram 400 that visually depicts an audio-video program 402 arranged along a time axis 403. As shown in FIG. 4, presentation data 404 is associated with audio-video program 402 (as represented by dashed lines interconnecting media program 302 and presentation data 304) and includes, for example, closed captioning data 406, audio data 408, and image scene data 410. Creation facility 102 may analyze closed captioning data 406, audio data 408, and/or image scene data 410 in any suitable manner, such as described herein, and generate a set of text data 412 that includes text data instances 414 (e.g., text data instances 414-1 through 414-N) associated with audio-video program 402. Set of text data 412 may include any suitable instances of text data that may be derived and/or extracted from presentation data 404 by creation facility 102. For example, text data instance 414-1 may include a first word extracted from closed captioning data 406, text data instance 414-2 may include a sentence extracted from audio data 408, and text data instance 414-3 may include a second word derived by analyzing a scene from audio-video program 402 included in image scene data 410. In addition, each text data instance 414 may include a timing indicator identifying a time point of audio-video program 402 that corresponds to the particular extracted instance of text data. Each text data instance 414 may also include any other suitable information, such as described herein.

As shown in FIG. 4, creation facility 102 may also analyze presentation data 404 and generate a set of image data 416 that includes image data instances 418 (e.g., image data instances 418-1 through 418-N) associated with audio-video program 402. Image data instances 418 may include any suitable image, scene, video clip, and/or audio clip of audio-video program 402 that may be used, for example, to generate a summary of audio-video program 402. For example, image data instance 418-1 may include a still image of audio-video program 402, image data instance 418-2 may include a first video clip of audio-video program 402, and image data instance 418-3 may include a second video clip of audio-video program 402. In addition, each image data instance 418 may include a timing indicator identifying a time point of audio-video program 402 that corresponds to the particular extracted instance of image data. Each image data instance 418 may also include any other suitable information, such as described herein.

Based on set of text data 412 (e.g., one or more text data instances 414), set of image data 416 (e.g., one or more image data instances 418), and/or metadata associated with media program 402, creation facility 102 may select a predefined media summary template 420 from a group of predefined media summary templates. Creation facility 102 may then populate predefined media summary template 420 with one or more of text data instances 414 and/or image data instances 418 to generate an automatically-generated summary 422 of audio-video program 402. As described herein, in certain examples, automatically-generated summary 422 may include a text only media summary, a video only media summary, or a combined text and video media summary of audio-video program 402.

Figure 5:
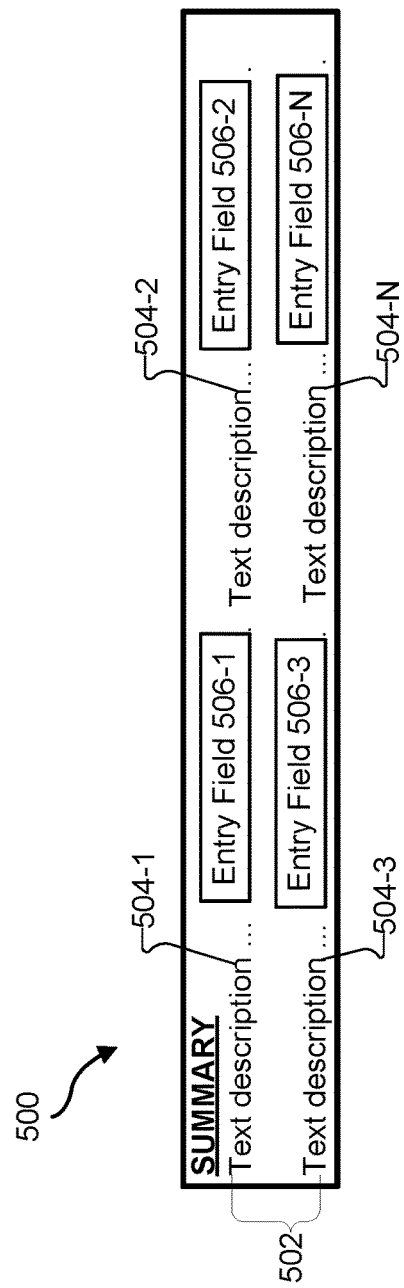
FIGS. 5-6 illustrate exemplary predefined media summary templates according to principles described herein.

FIG. 5 illustrates an exemplary text summary template 500 according to principles described herein. As shown in FIG. 5, text summary template 500 includes a summary section 502 that includes a plurality of text description portions 504 (e.g., text description portions 504-1 through 504-N) that are configured to remain the same regardless of the media program. Text description portions 504 are illustrated in FIG. 5 with a generic "Text description . . . " indicator. However, it is understood that any suitable text description may be provided in text description portions 504 as may suit a particular implementation. Summary section 502 also includes a plurality of entry fields 506 (e.g., entry fields 506-1 through 506-N) that may be populated by creation facility 102 with text that will vary depending on the media program for which the summary will be generated. Each of entry fields 506 may be associated with a particular piece of information that may be extracted from presentation data (e.g., presentation data 404) of the media program and included in a set of text data (e.g., set of text data 412). For example, entry field 506-1 may include information regarding a title of a media program, entry field 506-2 may include information regarding a subject of the media program, etc. Creation facility 102 may access, for example, words and/or sentences from the set of text data and insert them into appropriate entry fields 504 to populate summary section 502.

Figure 6:
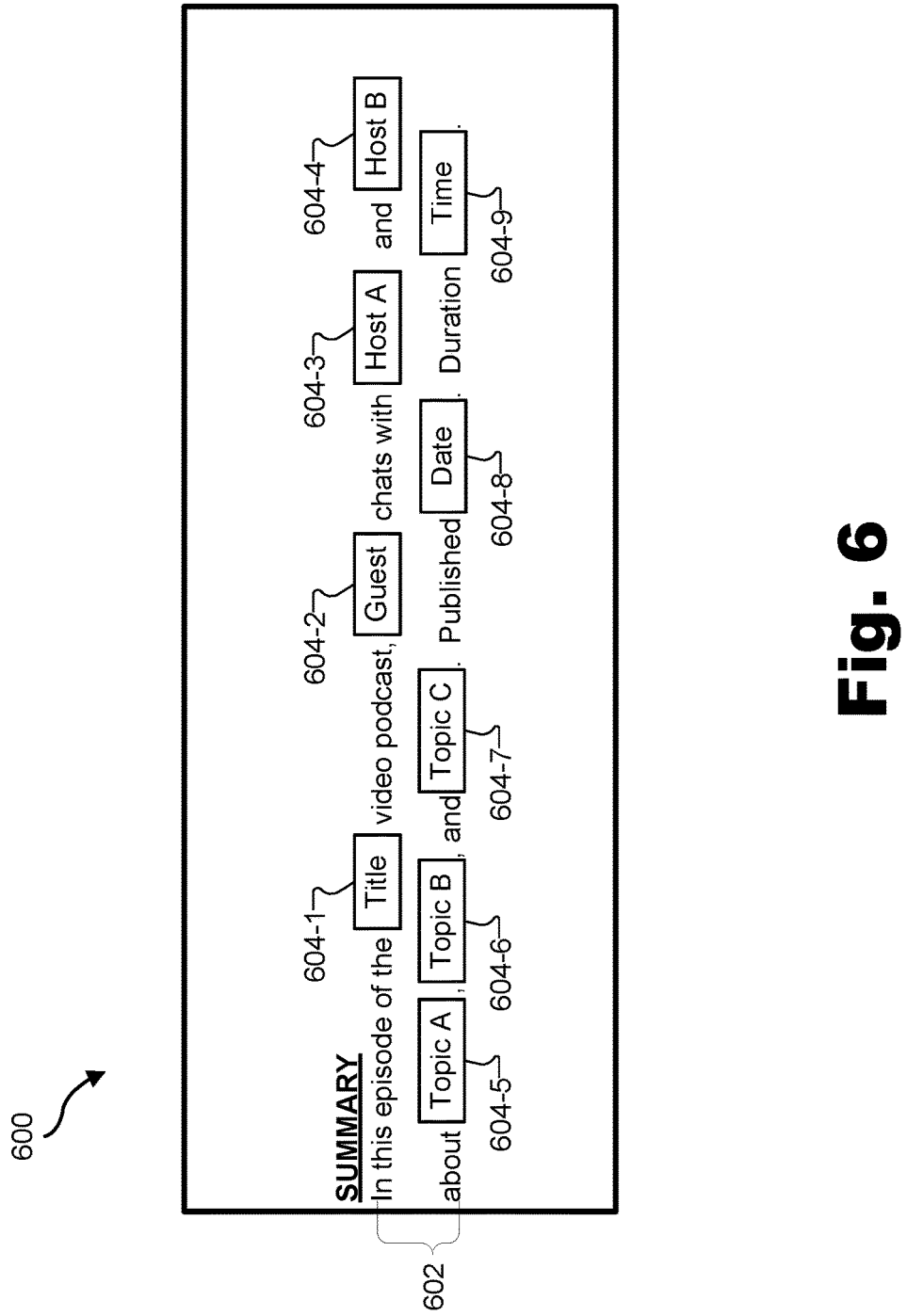

FIG. 6 illustrates an example of a predefined media summary template 600 that is specific to a video podcast category of media program. As shown in FIG. 6, predefined media summary template 600 includes a summary section 602 that includes a narrative text description and a plurality of entry fields 604 (e.g., entry fields 604-1 through 604-9) positioned at specific locations within the text description.

Creation facility 102 may select predefined media summary template 600 based on any suitable attribute indicating that a particular media program is a video podcast. In the example shown in FIG. 6, creation facility 102 may analyze presentation data of a particular video podcast and extract text data that indicates a title of the video podcast, a guest (e.g., a celebrity, politician, author, etc.) that participated in the video podcast, the hosts of the video podcast, the topics discussed during the video podcast, the date that the video podcast was published, and the length of the video podcast. Creation facility 102 may generate a set of text data based on the extracted text data and use the set of text data to automatically populate entry fields 604.

Figure 7:
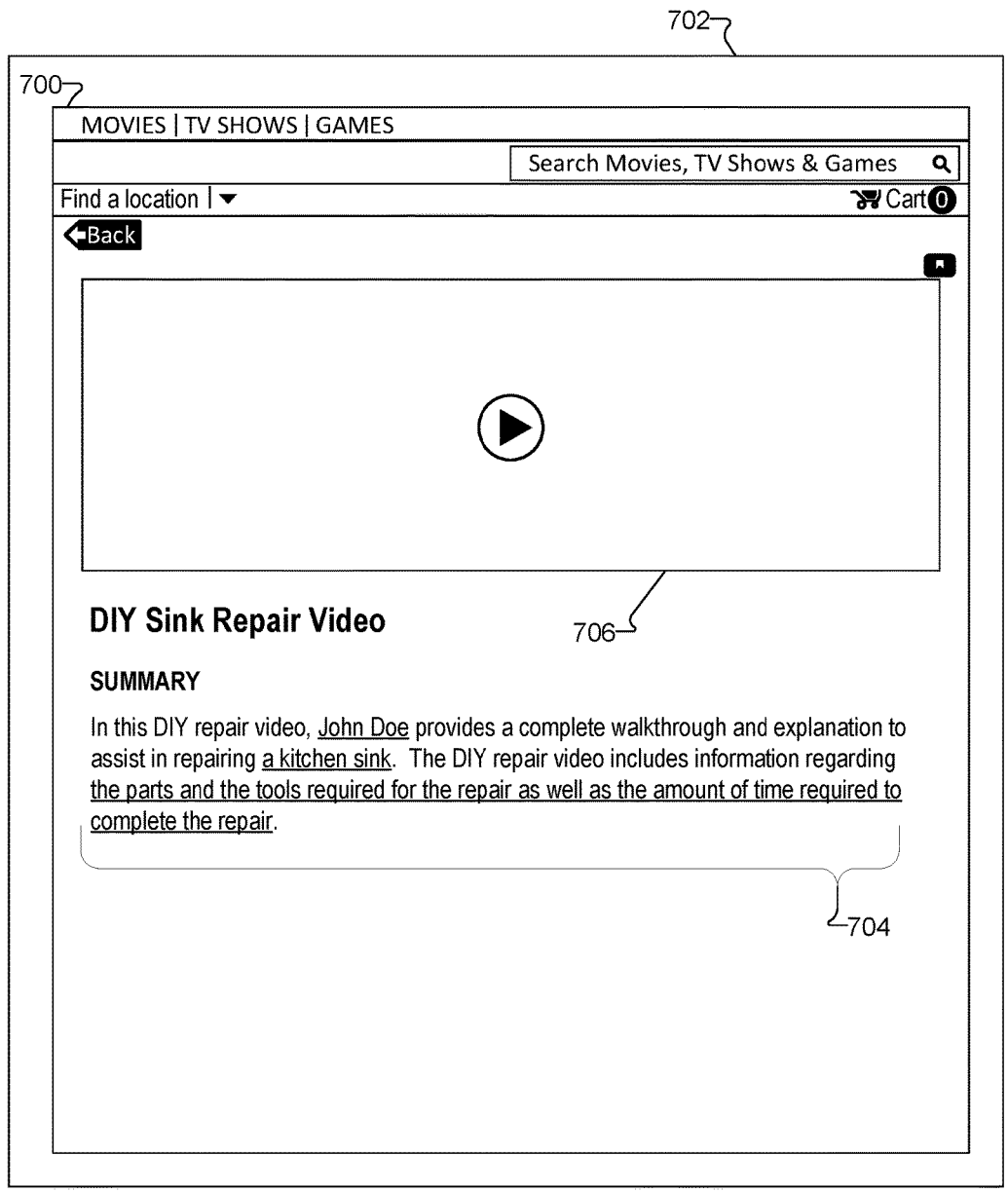
FIGS. 7-8 illustrate exemplary user interface views including media summaries according to principles described herein.

Creation facility 102 may provide one or more summaries for display to a user of a computing device (e.g., computing device 204) in any suitable manner. FIG. 7 illustrates an exemplary graphical user interface 700 displayed on a display screen 702 of a computing device. As shown in FIG. 7, a text summary 704 is provided for display together with a playback section 706 that allows a user to view a do-it-yourself ("DIY") sink repair video, which may have been posted to a video sharing web portal (e.g., YOUTUBE) by an end user of another computing device. Creation facility 102 may automatically generate text summary 704 at any suitable time and in any suitable manner, such as described herein. For example, creation facility 102 may automatically generate text summary 704 in response to the end user uploading the DIY sink repair video to the video sharing web portal.

In the example shown in FIG. 7, creation facility 102 may analyze images, audio components, etc. included in the DIY sink repair video and determine that John Doe is a presenter of the content included in the DIY sink repair video. Based on the analysis of the DIY sink repair video, creation facility 102 may also determine that the DIY sink repair video is specific to a kitchen sink and that the DIY sink repair video identifies the parts, the tools, and the time required to complete the repair. Creation facility 102 may use this information to generate a set of text data associated with the DIY sink repair video. Creation facility 102 may select a DIY repair video template from among a plurality of predefined media summary templates to use to automatically generate text summary 704. After creation facility 102 selects the DIY repair video template, creation facility 102 may insert "John Doe," "a kitchen sink," and "the parts and the tools required for the repair as well as the amount of time required to complete the repair" into entry fields of the template to automatically generate text summary 704.

Figure 8:
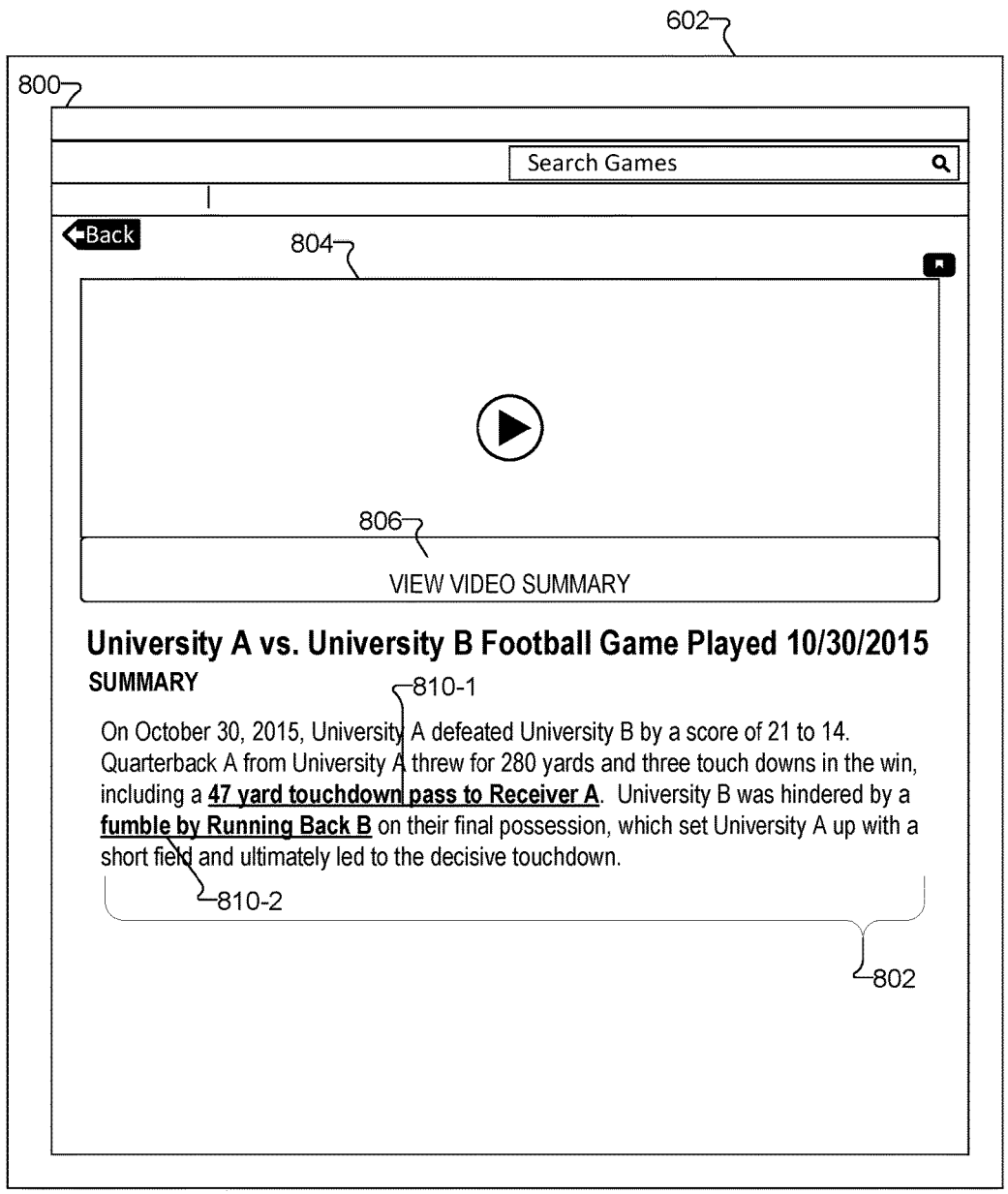

FIG. 8 illustrates an exemplary graphical user interface 800 displayed on display screen 602 of the computing device. As shown in FIG. 8, a text summary 802 is provided for display together with a playback section 804 that allows a user to view a previously broadcast football game between University A and University B. Creation facility 102 may automatically generate text summary 802 in any suitable manner, such as described herein. In the example shown in FIG. 8, an option 806 to view a video summary of the football game is provided for display together with text summary 802. Creation facility 102 may automatically generate the video summary of the football game in any suitable manner, such as described herein. For example, creation facility 102 may analyze presentation data of the football game and generate a set of video data and/or a set of text data. Creation facility 102 may select a video summary template specific to a football game category of media program and automatically generate the video summary based on the selected video summary template, the set of video data, and/or the set of text data. The video summary may include any suitable video clip, audio clip, image, or combination thereof that may be used to provide a summary of the football game. For example, the video summary may include highlights of the football program such as scoring plays, turnovers, etc.

As shown in FIG. 8, text summary 802 also includes links 810 (e.g., links 810-1 and 810-2) that operate as user-selectable trick play options. For example, link 810-1 is associated with a "47 yard touchdown pass to Receiver A," and link 810-2 is associated with a "fumble by Running Back B." Creation facility 102 may automatically generate text summary 802 such that links 810 are selectable by a user to facilitate playback of the football game and/or select portions of the football game. For example, the user may select, in any suitable manner, link 810-1. In response to the selection, playback of the football game may begin at a time point that is either at or right before the "47 yard touchdown pass to Receiver A". Alternatively, the user may be presented with an isolated video clip of the "47 yard touchdown pass to Receiver A."

Although the example shown in FIG. 8 includes only two links 810 in text summary 802, it is understood that any number of links may be included in a text summary as may suit a particular implementation. For example, in the example shown in FIG. 8, creation facility 102 may automatically generate text summary 802 such that a link is provided for each scoring play in the football game. In certain examples, the creation facility 102 may generate the link for each scoring play to be included in a text summary based on a specific search input provided by the user of the computing device. For example, the user may enter a search request "show me all the scoring plays" through any suitable user interface. Based on the search request, creation facility 102 may automatically generate the text summary, such as described herein, and provide the text summary for display to the user. The user of the computing device may select any one of the links to skip to and experience a different scoring play in the football game. In this or a similar manner, a text summary that includes user-selectable trick play options may facilitate efficient playback of a media program by allowing the user to conveniently navigate the media program by way of only the text summary. For example, the user may select certain portions of the text summary and skip forward to points of interest in the media program without having to perform a traditional fast forward operation. Similarly, the user may select certain portions of the text summary and skip backward to points of interest in the media program without having to perform a traditional rewind operation.

The exemplary user interfaces illustrated in FIGS. 7 and 8 are provided for illustrative purposes only. It is understood that one or more summaries of media programs may be presented to a user in other ways in other implementations.

Figure 9:
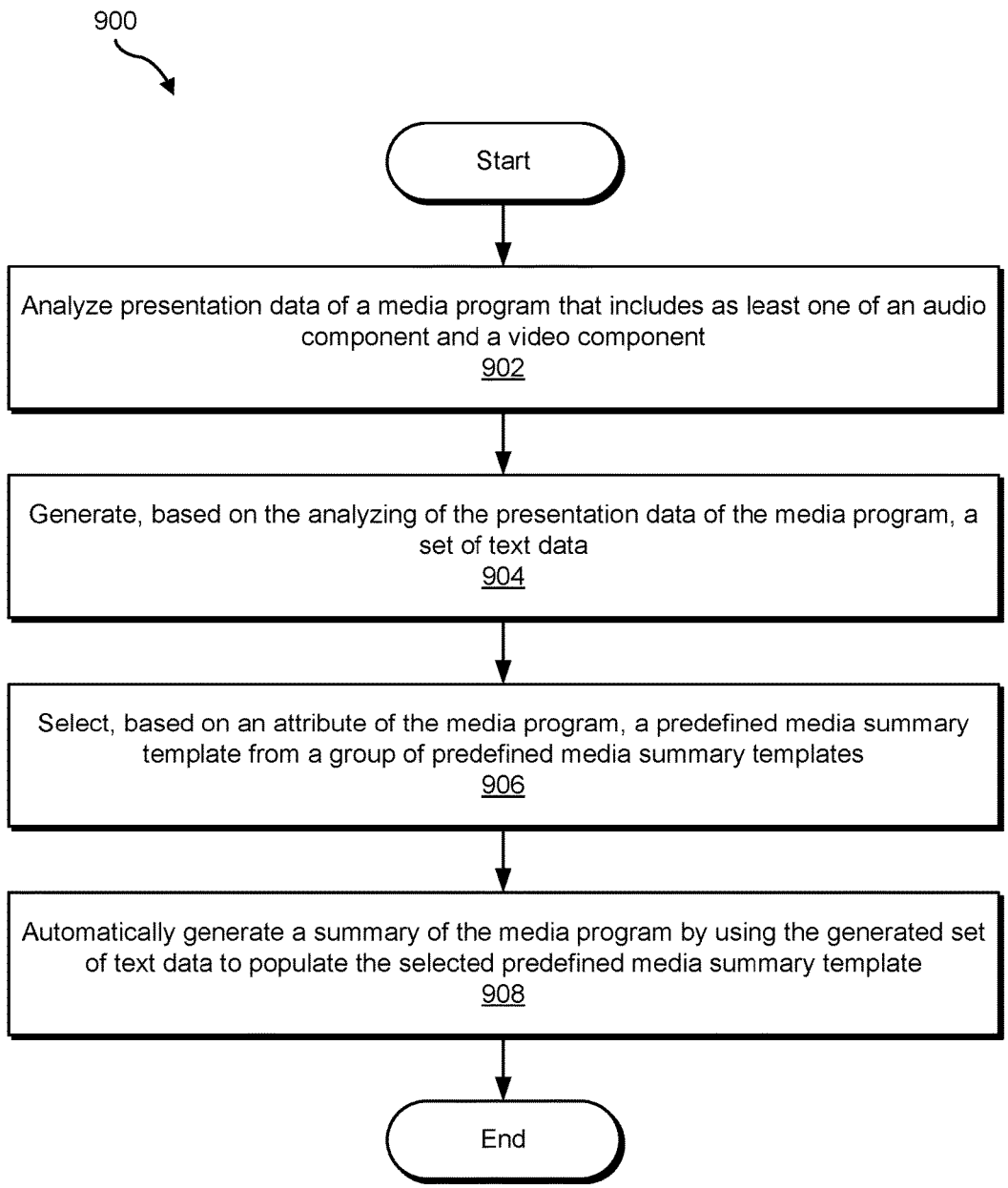
FIGS. 9-10 illustrate exemplary automatic media summary creation methods according to principles described herein.
Figure 10:
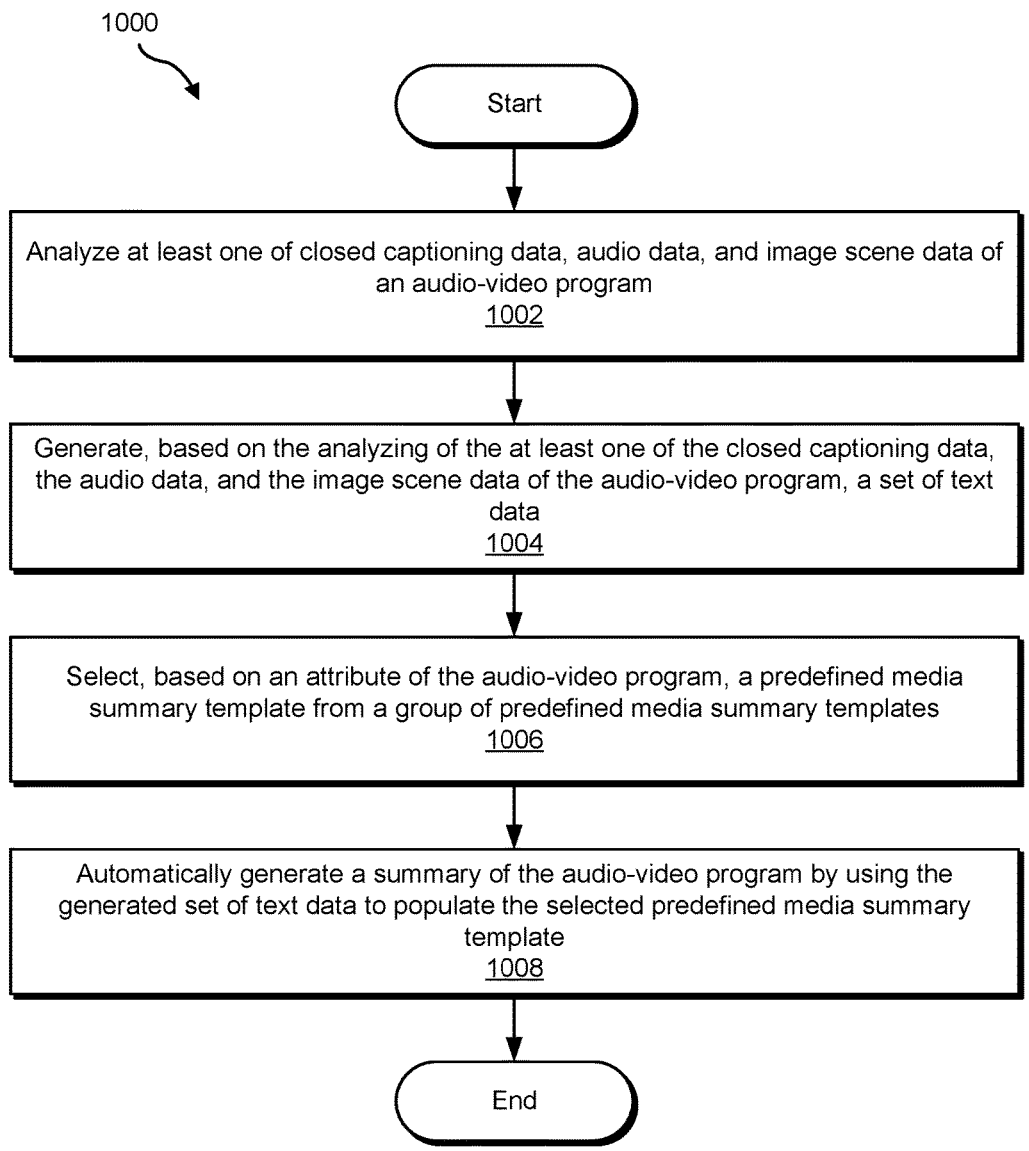

FIGS. 9-10 illustrate exemplary automatic media summary creation methods 900 and 1000 according to principles described herein. While FIGS. 9-10 illustrate exemplary operations according to certain embodiments, other embodiments may omit, add to, reorder, combine, and/or modify any of the operations shown in FIGS. 9-10. In certain embodiments, one or more of the operations shown in FIGS. 9-10 may be performed by system 100 and/or one or more components or implementations of system 100.

Turning to FIG. 9, in operation 902, a system (e.g., system 100) may analyze presentation data of a media program that includes at least one of an audio component and a video component. Operation 902 may be performed in any of the ways described herein.

In operation 904, the system may generate, based on the analyzing of the presentation data of the media program, a set of text data. Operation 904 may be performed in any of the ways described herein.

In operation 906, the system may select, based on an attribute of the media program, a predefined media summary template from a group of predefined media summary templates. Operation 906 may be performed in any of the ways described herein.

In operation 908, the system may automatically generate a summary of the media program by using the generated set of text data to populate the selected predefined media summary template. Operation 908 may be performed in any of the ways described herein.

Turing to FIG. 10, in operation 1002, a system (e.g., system 100) may analyze at least one of closed captioning data, audio data, and image scene data of an audio-video program. Operation 1002 may be performed in any of the ways described herein.

In operation 1004, the system may generate, based on the analyzing of the at least one of the closed captioning data, the audio data, and the image scene data of the audio-video program, a set of text data. Operation 1004 may be performed in any of the ways described herein.

In operation 1006, the system may select, based on an attribute of the audio-video program, a predefined media summary template from a group of predefined media summary templates. Operation 1006 may be performed in any of the ways described herein.

In operation 1008, the system may automatically generate a summary of the audio-video program by using the generated set of text data to populate the selected predefined media summary template. Operation 1008 may be performed in any of the ways described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), a Flash Electrically EPROM (FLASH-EEPROM), any other memory chip or cartridge, or any other tangible medium from which a computer may read.

Figure 11:
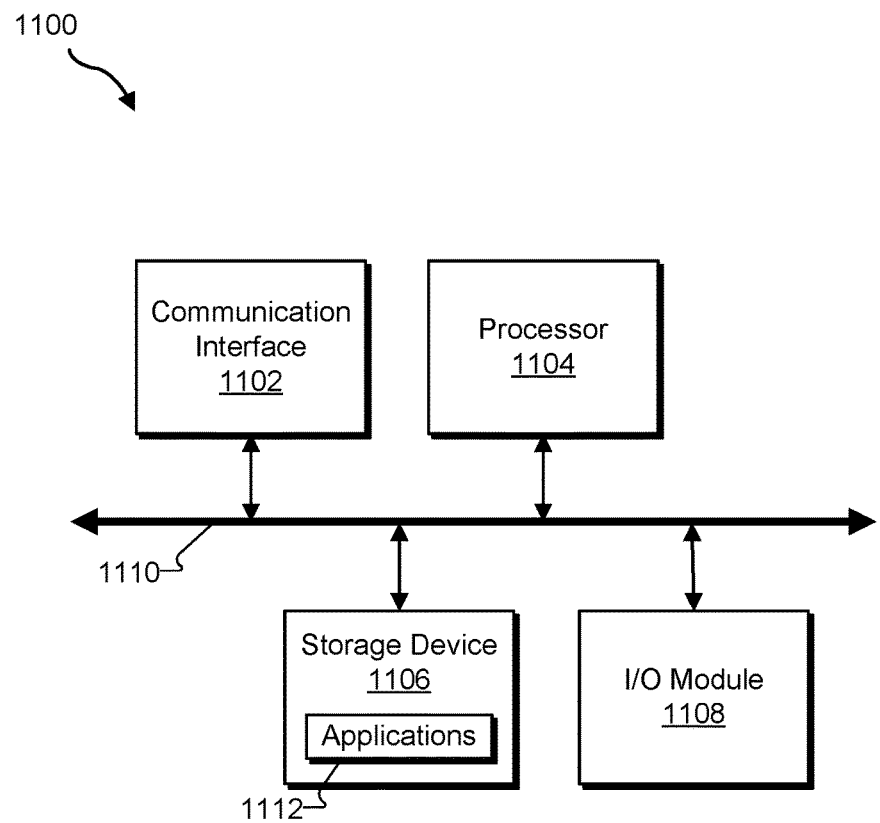
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output (I/O) module 1108 communicatively connected via a communication infrastructure 1110. While an exemplary computing device 1100 is shown in FIG. 11, the components illustrated in FIG. 11 are not intended to be limiting. Additional or alternative components and/or configurations of components may be used in other embodiments. For example, in addition or alternative to being communicatively connected by way of communication infrastructure 1110, one or more components of computing device 1100 may be communicatively connected by way of one or more other suitable interfaces. For instance, communication interface 1102, storage device 1106, I/O module 1108, and/or any other components of computing device 1100 may be communicatively coupled directly to processor 1104 via one or more interfaces (e.g., discrete interfaces). Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, and any other suitable interface. In at least one embodiment, communication interface 1102 may provide a direct connection between system 100 and one or more of provisioning systems via a direct link to a network, such as the Internet. Communication interface 1102 may additionally or alternatively provide such a connection through, for example, a local area network (such as an Ethernet network), a personal area network, a telephone or cable network, a satellite data connection, a dedicated URL, or any other suitable connection. Communication interface 1102 may be configured to interface with any suitable communication media, protocols, and formats, including any of those mentioned above.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory (RAM), dynamic RAM (DRAM), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a touch screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1100. For example, one or more applications 1112 residing within storage device 1106 may be configured to direct processor 1104 to perform one or more processes or functions associated with system 100 or any components thereof. Such an implementation may be referred to as a computer-implemented system, such as a computer-implemented automatic media summary creation system 100.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

analyzing, by a computer-implemented automatic media summary creation system, presentation data of a media program that includes at least one of an audio component and a video component;

generating, by the computer-implemented automatic media summary creation system and based on the analyzing of the presentation data of the media program, a set of text data;

selecting, by the computer-implemented automatic media summary creation system and based on an attribute of the media program, a predefined text media summary template from a group of predefined text media summary templates;

automatically generating, by the computer-implemented automatic media summary creation system, a narrative text summary of the media program by using the generated set of text data to populate the selected predefined text media summary template, the narrative text summary including a plurality of narrative links to specific predefined portions within the media program; and providing, by the computer-implemented automatic media summary creation system, the narrative text summary of the media program for display in a graphical user interface displayed on a display screen of a computing device, the narrative text summary spaced apart from a video playback section in the graphical user interface, the narrative text summary including the plurality of narrative links to the specific predefined portions within the media program, each narrative link included in the plurality of narrative links displayed within the graphical user interface being selectable by a user to initiate a playback, in the video playback section, of a different respective specific predefined portion of the media program.

2. The method of claim 1, wherein the analyzing of the presentation data of the media program comprises analyzing at least one of closed captioning data of the media program, image scene data of the media program, and derived text data created by speech-to-text converting audio data of the media program.

3. The method of claim 1, wherein the generating of the set of text data comprises at least one of identifying at least one of a sentence and a word to extract from the presentation data and include in the set of text data, performing a named-entity recognition process to identify one or more named entities associated with the media program, and identifying a theme associated with the media program.

4. The method of claim 1, further comprising:

generating, by the computer-implemented automatic media summary creation system and based on the analyzing of the presentation data of the media program, a set of image data associated with the media program, the set of image data temporally aligned with the set of text data; and automatically generating, by the computer-implemented automatic media summary creation system, a video summary of the media program based on the set of text data and the set of image data.

5. The method of claim 1, further comprising deriving, by the computer-implemented automatic media summary creation system, the attribute of the media program from at least one of metadata associated with the media program and the generated set of text data.

6. The method of claim 1, wherein each predefined text media summary template included in the group of predefined text media summary templates is specific to a particular category of media program.

7. The method of claim 1, embodied as computer-executable instructions on at least one non-transitory computer-readable medium.

8. The method of claim 1, wherein the specific predefined portions within the media program correspond to highlights of the media program that have a predefined start time and a predefined stop time within the playback of the media program.

9. The method of claim 8, wherein the media program is a sporting event and the highlights correspond to plays that occurred during the sporting event.

10. A method comprising:
analyzing, by a computer-implemented automatic media summary creation system, at least one of closed captioning data, audio data, and image scene data of an audio-video program;
generating, by the computer-implemented automatic media summary creation system and based on the analyzing of the at least one of the closed captioning data, the audio data, and the image scene data of the audio-video program, a set of text data;
selecting, by the computer-implemented automatic media summary creation system and based on an attribute of the audio-video program, a predefined text media summary template from a group of predefined text media summary templates;
automatically generating, by the computer-implemented automatic media summary creation system, a narrative text summary of the audio-video program by using the generated set of text data to populate the selected predefined text media summary template, the narrative text summary including a plurality of narrative links to specific predefined portions within the audio-video program; and
providing, by the computer-implemented automatic media summary creation system, the narrative text summary of the audio-video program for display in a graphical user interface displayed on a display screen of a computing device, the narrative text summary spaced apart from a video playback section in the graphical user interface, the narrative text summary including the plurality of narrative links to the specific predefined portions within the audio-video program, each narrative link included in the plurality of narrative links displayed within the graphical user interface being selectable by a user to initiate a playback, in the video playback section, of a different respective specific predefined portion of the audio-video program.

11. The method of claim 10, further comprising:
generating, by the computer-implemented automatic media summary creation system and based on the analyzing of the at least one of the closed captioning data, the audio data, and the image scene data of the audio-video program, a set of image data associated with the audio-video program, the set of image data temporally aligned with the set of text data; and
automatically generating, by the computer-implemented automatic media summary creation system, a video summary of the audio-video program based on the set of text data and the set of image data.

12. The method of claim 10, wherein:
the audio-video program comprises video content generated by an end user of a computing device and uploaded by the end user to a video sharing web portal; and
the automatically generating of the narrative text summary of the audio-video program is performed by the computer-implemented automatic media summary creation system in response to the end user uploading the audio-video program to the video sharing web portal.

13. The method of claim 10, wherein:
the analyzing of the at least one of the closed captioning data, the audio data, and the image scene data of the audio-video program comprises analyzing images included in every $N^{th}$ frame of the audio-video program: and
the generating of the set of text data comprises creating a set of visually-derived words based on the analyzed images.

14. The method of claim 10, embodied as computer-executable instructions on at least one non-transitory computer-readable medium.

15. A system comprising:
at least one processor; and
a non-transitory computer-readable medium storing instructions that, when executed by the at least one processor, causes the at least one processor to:
analyze presentation data of a media program that includes at least one of an audio component and a video component;
generate, based on the analyzing of the presentation data of the media program, a set of text data;
select, based on an attribute of the media program, a predefined text media summary template from a group of predefined text media summary templates;
automatically generate a narrative text summary of the media program by using the generated set of text data to populate the selected predefined text media summary template, the narrative text summary including a plurality of narrative links to specific predefined portions within the media program; and
provide the narrative text summary of the media program for display in a graphical user interface displayed on a display screen of a computing device, the narrative text summary spaced apart from a video playback section in the graphical user interface, the narrative text summary including the plurality of narrative links to the specific predefined portions within the media program, each narrative link included in the plurality of narrative links displayed within the graphical user interface being selectable by a user to initiate a playback, in the video playback section, of a different respective specific predefined portion of the media program.

16. The system of claim 15, wherein the at least one processor analyzes the presentation data of the media program by analyzing at least one of
closed captioning data of the media program,
image scene data of the media program, and
derived text data created by speech-to-text converting audio data of the media program.

17. The system of claim 15, wherein the at least one processor generates the set of text data by at least one of
identifying at least one of a sentence and a word to extract from the presentation data and include in the set of text data, performing a named-entity recognition process to identify one or more named entities associated with the media program, and identifying a theme associated with the media program.

18. The system of claim 15, wherein each text media summary template included in the group of predefined text media summary templates is specific to a particular category of media program.

* * * * *